United States Patent
Kiadeh et al.

(10) Patent No.: US 9,438,110 B2
(45) Date of Patent: Sep. 6, 2016

(54) SYSTEMS AND METHODS FOR FEED-FORWARD CONTROL OF LOAD CURRENT IN DC TO DC BUCK CONVERTERS

(71) Applicant: Maxim Integrated Products, Inc., San Jose, CA (US)

(72) Inventors: Mansur Kiadeh, Cupertino, CA (US); Paul Latham, Lee, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 193 days.

(21) Appl. No.: 14/274,904

(22) Filed: May 12, 2014

(65) Prior Publication Data

US 2014/0247032 A1 Sep. 4, 2014

Related U.S. Application Data

(63) Continuation of application No. 13/034,055, filed on Feb. 24, 2011, now Pat. No. 8,723,499.

(51) Int. Cl.
| | | |
|---|---|---|
| G05F 1/56 | (2006.01) | |
| H02M 3/156 | (2006.01) | |
| G05F 1/565 | (2006.01) | |
| G05F 1/46 | (2006.01) | |

(52) U.S. Cl.
CPC .............. H02M 3/156 (2013.01); G05F 1/462 (2013.01); G05F 1/565 (2013.01)

(58) Field of Classification Search
CPC .... H02M 3/145; H02M 3/156; H02M 3/158; G05F 1/462; G05F 1/565; G05F 1/575
See application file for complete search history.

(56) References Cited

U.S. PATENT DOCUMENTS

| | | | |
|---|---|---|---|
| 5,598,092 A | 1/1997 | Ohtsuka et al. | ............... 323/222 |
| 6,441,597 B1 | 8/2002 | Lethellier | ...................... 323/282 |
| 6,600,298 B2 * | 7/2003 | McDonald | ............ H02M 3/156 |
| | | | 323/271 |
| 7,362,083 B2 * | 4/2008 | Scoones | ................ H02M 3/158 |
| | | | 323/284 |
| 7,612,545 B2 | 11/2009 | Umemoto et al. | ............ 323/271 |
| 7,898,225 B2 | 3/2011 | Tsai et al. | ...................... 323/222 |
| 2009/0027025 A1 | 1/2009 | Latham et al. | ................ 323/283 |
| 2012/0217945 A1 | 8/2012 | Kiadeh et al. | ................ 323/285 |
| 2014/0375290 A1 * | 12/2014 | Mizuno | ................. H02M 3/156 |
| | | | 323/282 |
| 2015/0137776 A1 * | 5/2015 | Thomas | .............. H02M 3/1588 |
| | | | 323/271 |

OTHER PUBLICATIONS

Office Action dated Feb. 11, 2014 from the China Patent Office for Chinese Patent Application No. 201210042097.3.
Wang Guo-hua el al., "Application of PCB Electronic Current Transformer in Relay Protection", Measurement & Control Technology, vol. 28, No. 1, pp. 95-98, Jan. 2009.
Guo Feng-kai et al., "Design of CPU Voltage Regulation Using the Droop Method", Computer Engineering & Science, vol. 31, No. 12, pp. 81-83, Dec. 2009.

* cited by examiner

*Primary Examiner* — Matthew Nguyen

(57) ABSTRACT

A system for controlling load current in a voltage converter includes a current normalization module that receives a first measurement corresponding to the load current, receives a second measurement corresponding to an inductor current, and matches a first gain of the first measurement corresponding to the load current to a second gain of the second measurement corresponding to the inductor current to generate a normalized load current. A feed-forward generation module receives the normalized load current from the current normalization module and generates a load current feed-forward (LCFF) signal based on the normalized load current. A duty cycle generation module generates a duty cycle used to control the voltage converter based on a commanded output voltage of the voltage converter and the LCFF signal.

18 Claims, 10 Drawing Sheets

SYSTEMS AND METHODS FOR FEED-FORWARD CONTROL OF LOAD CURRENT IN DC TO DC BUCK CONVERTERS

CROSS-REFERENCE TO RELATED APPLICATIONS

This application is a continuation of U.S. patent Ser. No. 13/034,055, filed Feb. 24, 2011. The disclosure of the above application is incorporated herein by reference in its entirety.

FIELD

The present disclosure relates to control systems for power supplies and more particularly to systems and methods for feed-forward control of load current in direct current (DC) to DC buck converters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A power supply outputs a predetermined voltage that may be used to power one or more components. For example, the predetermined voltage may power one or more components of an integrated circuit (IC). In some situations, however, a voltage that is less than the predetermined voltage may be sufficient to power one or more components. The lower voltage may be obtained from the predetermined voltage using a voltage divider circuit. Voltage divider circuits, however, are inefficient and inaccurate.

A step-down (i.e., buck) converter may be implemented to provide the lower voltage. Under certain conditions, a buck converter is generally more efficient and more accurate than a voltage divider circuit. A buck converter may include an inductor, a capacitor, two switches, and a controller. The buck converter alternates between charging the inductor by connecting the inductor to the predetermined voltage and discharging the inductor to a load.

SUMMARY

A feed-forward control system for load current in a direct current (DC) to DC converter includes a current normalization module, a feed-forward generation module, and a duty cycle generation module. The current normalization module generates a normalized load current by matching a gain of a measured load current to a gain of an inductor current. The feed-forward generation module that generates a load current feed-forward (LCFF) signal based on the normalized load current. The duty cycle generation module generates a duty cycle for the DC to DC converter based on a commanded output voltage and the LCFF signal.

A method for feed-forward control of load current in a direct current (DC) to DC converter includes generating a normalized load current by matching a gain of a measured load current to a gain of an inductor current, generating a load current feed-forward (LCFF) signal based on the normalized load current, and generating a duty cycle for the DC to DC converter based on a commanded output voltage and the LCFF signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
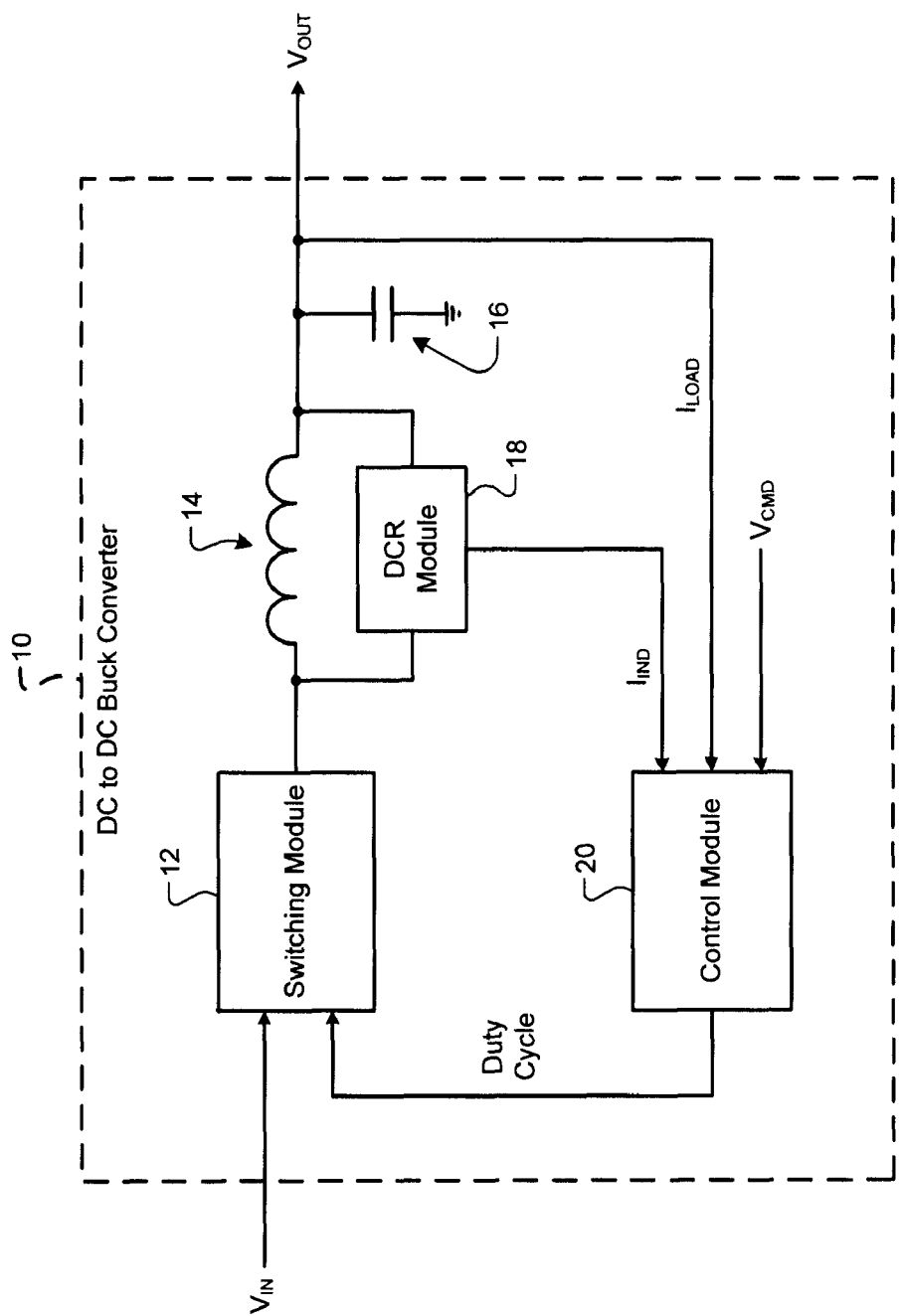
FIG. 1 is a functional block diagram of a DC to DC buck converter according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit;

a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A voltage step refers to a change in the commanded output voltage of a buck converter. For example, a step-down refers to a decrease in the commanded output voltage. A control system may control the output voltage by adjusting a duty cycle of switches in the buck converter based on output voltage feedback. Slow feedback after a voltage step, however, may increase the response to a load step ("step response") by the control system. For example, the increased step response may cause a drop in output voltage. The bandwidth of the control system may be increased to improve the step response. Increasing the bandwidth, however, may also increase noise.

"Apparent bandwidth" refers to an effective bandwidth achieved by the control system. For example, the apparent bandwidth may be increased without increasing the actual bandwidth of the control system. Therefore, increasing the apparent bandwidth of the control system may improve step response without increasing noise. Moreover, as a result of the increased apparent bandwidth, the size of the capacitor in the buck converter may be decreased while maintaining a low voltage drop and a smooth recovery after a load step while also decreasing area and costs. Using feed-forward control of the load current may be used to increase the apparent bandwidth of the control system.

Accordingly, systems and methods for feed-forward control of load current in a DC to DC buck converter are presented. For example, the systems or methods may be implemented via (i) firmware/hardware, (ii) analog components (e.g., operational amplifiers), and/or (iii) digital components (e.g., a digital signal processing, or DSP controller). The systems and methods include generating a load current feed-forward (LCFF) signal based on the load current (and in some cases also based on the inductor current). The LCFF signal may then be added to a base duty cycle (based on the commanded voltage) to generate the duty cycle for the switches in the buck converter. For example, the load current may be measured using a printed circuit board (PCB) trace and the inductor current may be measured using a direct-current resistance (DCR) method.

A resistance of a lead used to measure the load current, however, may be unknown and therefore the measured load current may be inaccurate. Therefore, the measured load current may be normalized to match a gain of the load current to a gain of the measured inductor current. For example, the normalized current may be generated using a least-mean-square (LMS) filter. The LCFF signal may be generated based on the normalized current according to one of three methods. A first method includes generating the LCFF signal based on the normalized current. A second method includes generating the LCFF signal based on a square of the error between the normalized current and the inductor current. A third method includes generating the LCFF signal based on a product of the inductor current and a difference between the normalized current and the inductor current.

In some implementations, the first, second, or third methods may also implement a high pass filter (HPF) to remove any DC error/offset. For example, DC offset may be present after an analog-to-digital (A-D) conversion. The systems and methods, however, apply to both digital and analog systems. For example only, the systems and methods may decrease a drop in output voltage by 1.0-1.5%. Additionally, for example only, the systems and methods may allow a size of the buck converter capacitor to be decreased by 30-50% (thus decreasing area and costs) while still maintaining performance.

Referring now to FIG. 1, an example of a DC to DC buck converter 10 is shown. The buck converter 10 includes a switching module 12 that controls a connection between an input voltage ($V_{IN}$) and an inductor 14. Specifically, the switching module 12 switches the connection between the inductor 14 and the input voltage $V_{IN}$ according to a duty cycle. For example, the switching module 12 may include a digital pulse-width modulator (DPWM) and field effect transistors (FETs) (not shown). A capacitor 16 is connected between the inductor 14 and ground to provide filtering of an output voltage ($V_{OUT}$) and smoothing of the step response. When the switching module 12 disconnects the input voltage $V_{IN}$ from the inductor 14, the inductor 14 and the capacitor 16 (collectively referred to as an inductor-capacitor, or LC circuit) discharge at the output voltage $V_{OUT}$ having a magnitude less than the input voltage ($V_{IN}$).

A direct-current resistance (DCR) module 18 performs DCR current sensing to measure current flowing through the inductor ($I_{IND}$). For example, the DCR module 18 may include a resistor-capacitor (RC) circuit (not shown) connected in parallel across the inductor 14. A control module 20 generates the duty cycle for the switching module 12 based on the inductor current $I_{IND}$, load current ($I_{LOAD}$), and a commanded voltage ($V_{CMD}$). The commanded voltage $V_{CMD}$ represents a desired voltage to be generated by the buck converter 10.

The load current $I_{LOAD}$, on the other hand, represents a current flowing out of the buck converter 10 to a connected load. For example, the load current $I_{LOAD}$ may be measured via a PCB trace. More specifically, the load current $I_{LOAD}$ is measurable because an output lead of the buck converter 10 has a built-in resistance. The built-in resistance, however, is unknown. Therefore, the measured load current $I_{LOAD}$ may be inaccurate. Accordingly, the measured load current $I_{LOAD}$ may be normalized by matching a gain of the measured load current $I_{LOAD}$ to a gain of the inductor current $I_{IND}$. For example, the measured load current may be normalized using an LMS filter (not shown).

Figure 2:
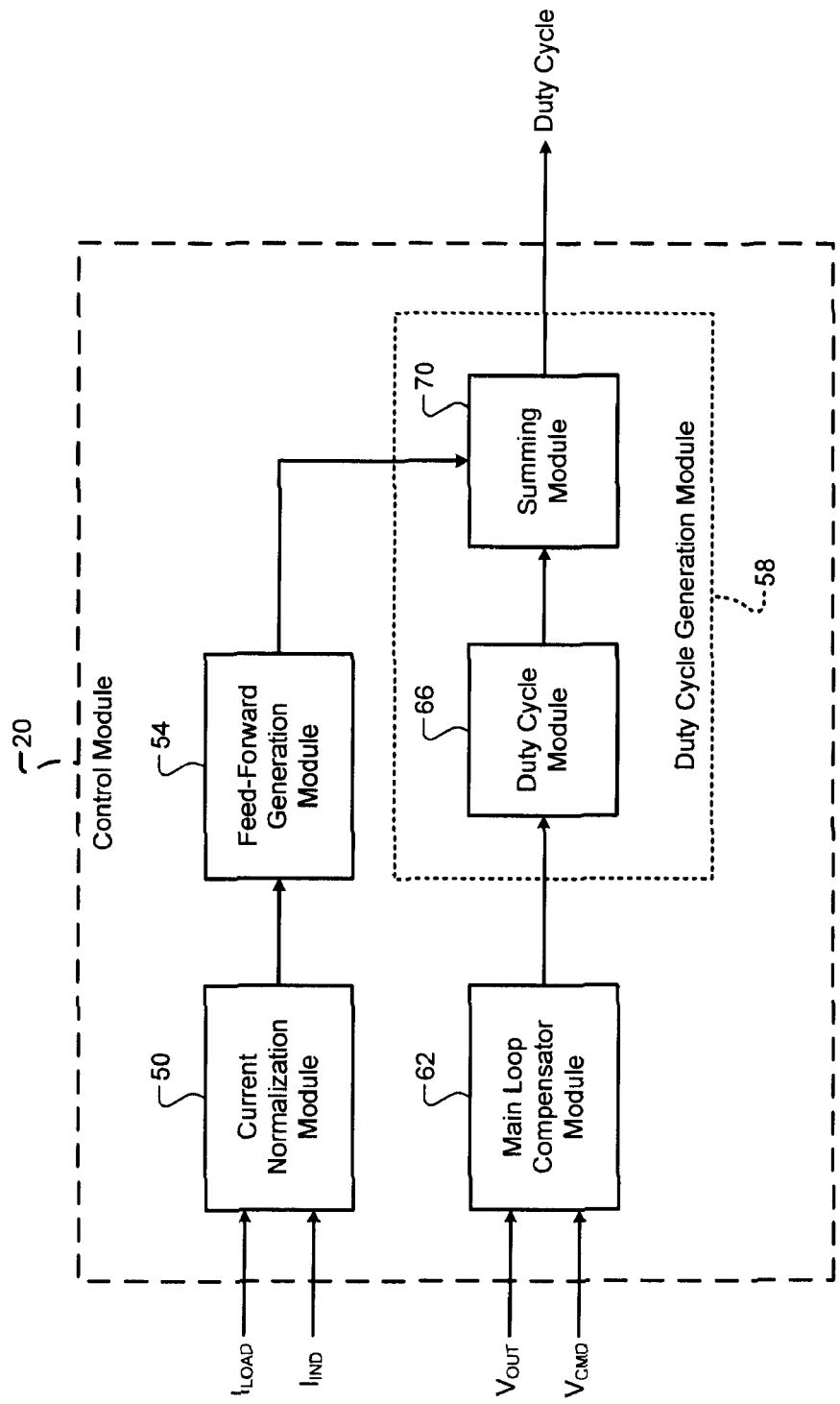
FIG. 2 is a functional block diagram of a control module for the DC to DC buck converter according to one implementation of the present disclosure.

Referring now to FIG. 2, an example of the control module 20 is shown. The control module 20 includes a current normalization module 50, a feed-forward generation module 54, a duty cycle generation module 58, and a main loop compensator module 62. The duty cycle generation module 58 may further include a duty cycle module 66 and a summing module 70.

The current normalization module 50 receives the load current $I_{LOAD}$ and the inductor current $I_{IND}$. In some implementations, the current normalization module 50 may receive digital signals generated by analog-to-digital (A-D) converters representing the load current $I_{LOAD}$ and the inductor current $I_{IND}$, respectively. Alternatively, the current normalization module 50 may receive the load current $I_{LOAD}$ and the inductor current $I_{IND}$ directly (i.e., analog operation). The current normalization module 50 normalizes the load current $I_{LOAD}$ to generate a normalized load current $I_N$. Specifically, the current normalization module 50 matches a gain of the load current $I_{LOAD}$ to a gain of the inductor current $I_{IND}$.

The feed-forward generation module 54 receives the normalized load current $I_N$. The feed-forward generation module 54 generates an LCFF signal according to one of three methods (hereinafter referred to as the first, second, and third feed-forward methods, respectively). According to the first feed-forward method, the feed-forward generation module 54 may generate the LCFF signal based on the normalized load current $I_N$. The LCFF signal generated by the first feed-forward method may represent an inductor volt-second demanded by the load current.

According to the second feed-forward method, the feed-forward generation module 54 may generate the LCFF signal based on a square of the error between the normalized load current $I_N$ and the inductor current $I_{IND}$. The LCFF signal generated by the second feed-forward method may represent an approximate duty cycle demanded by the load current. According to the third feed-forward method, the feed-forward generation module 54 may generate the LCFF signal based on a product of the inductor current $I_{IND}$ and the difference between the normalized load current $I_N$ and the inductor current $I_{IND}$. The LCFF signal generated by the third feed-forward method may represent generate an ideal duty cycle.

The main loop compensator module 62 generates a value for the duty cycle generation module 58. For example, the value may represent feedback-based control of the duty cycle. In other words, the value may represent a required change in the duty cycle to achieve the commanded voltage $V_{CMD}$ at the output voltage $V_{OUT}$. The duty cycle module 66 generates a base duty cycle based on the value from the main loop compensator module 62. The summing module 70 generates the duty cycle for the switching module 12 based on a sum of the base duty cycle and the LCFF signal (from the feed-forward generation module 54).

Figure 3A:
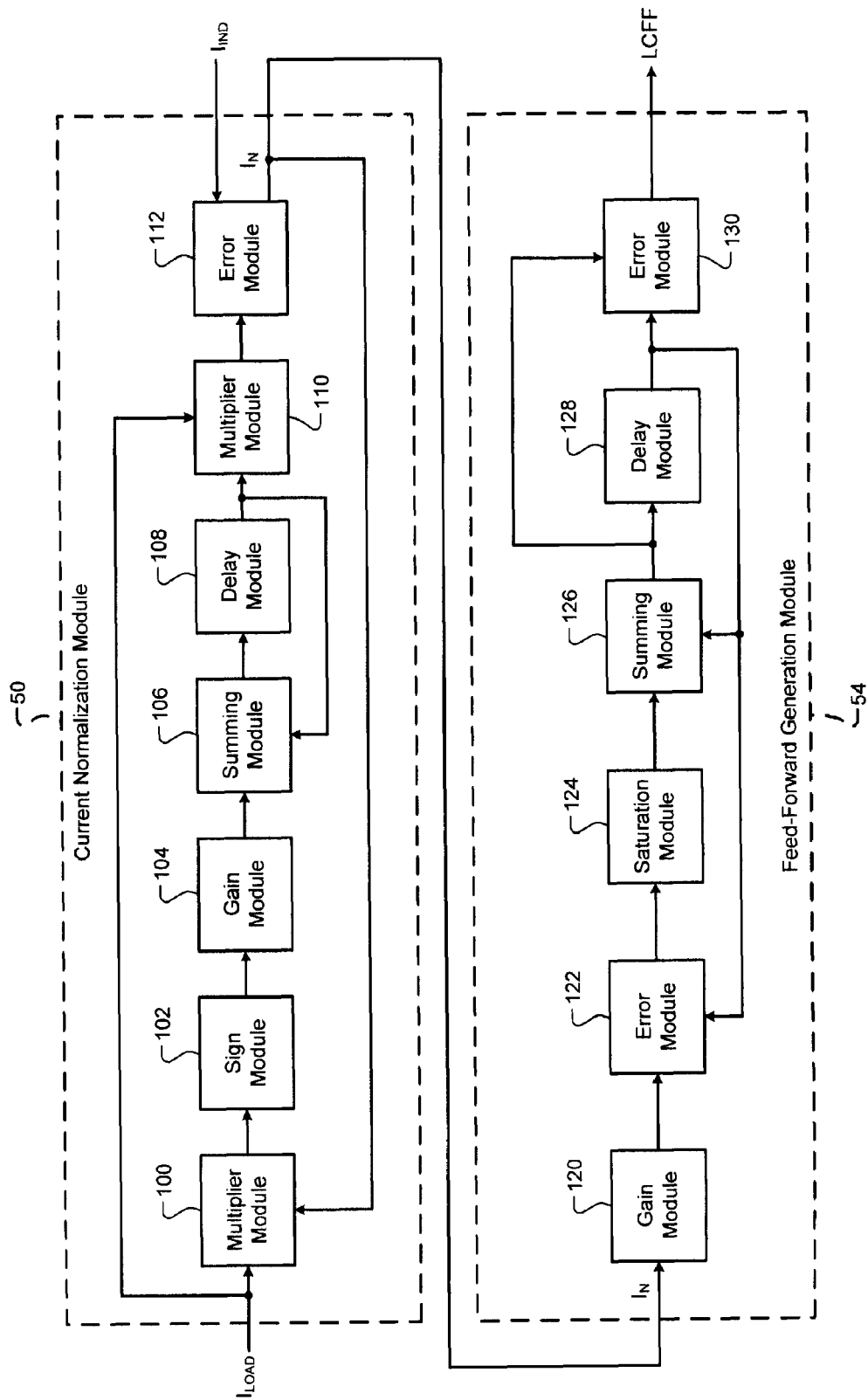
FIG. 3A is a functional block diagram of a current normalization module and a feed-forward generation module according to one implementation of the present disclosure.

Referring now to FIG. 3A, an example of the current normalization module 50 and the feed-forward generation module 54 according to the first feed-forward method is shown. The current normalization module 50 includes a multiplier module 100, a sign module 102, a gain module 104, a summing module 106, a delay module 108, a multiplier module 110, and an error module 112.

The multiplier module 100 generates a product of the load current $I_{LOAD}$ and the normalized current $I_N$ (received as feedback). The sign module 102 switches a sign of the product. The gain module 104 applies a gain to the signed product. The summing module 106 calculates a sum of the output of the gain module 104 and a first correction factor. The delay module 108 introduces a one sample (Ts) delay to the sum to generate the first correction factor. For example, the one sample Ts delay may be introduced because a Laplace transformation converted various metrics from the time domain to the frequency domain for purposes of duty cycle control. The multiplier module 110 generates a product of the load current $I_{LOAD}$ and the first correction factor. The error module 112 generates the normalized current $I_N$ based on a difference between the inductor current $I_{IND}$ and the product.

The feed-forward generation module 54 includes a gain module 120, an error module 122, a saturation module 124, a summing module 126, a delay module 128, and an error module 130. The gain module 120 applies a gain to the normalized current $I_N$. The error module 122 calculates an error between the output of the gain module 120 and a second correction factor. The saturation module 124 limits the error to a predetermined range. For example, limiting the sum to a predetermined range (i.e., saturation limits) may prevent windup. Additionally, for example only, the predetermined range may be based on a supply voltage ($V_{DD}$) and a bulk voltage ($V_{BULK}$) of a low-side body diode. The summing module 126 calculates a sum of the limited error and the second correction factor. The delay module 128 introduces a one sample Ts delay to the output of the summing module 126 to generate the second correction factor. The error module 130 generates the LCFF signal based on a difference between the sum and the second correction factor.

Figure 3B:
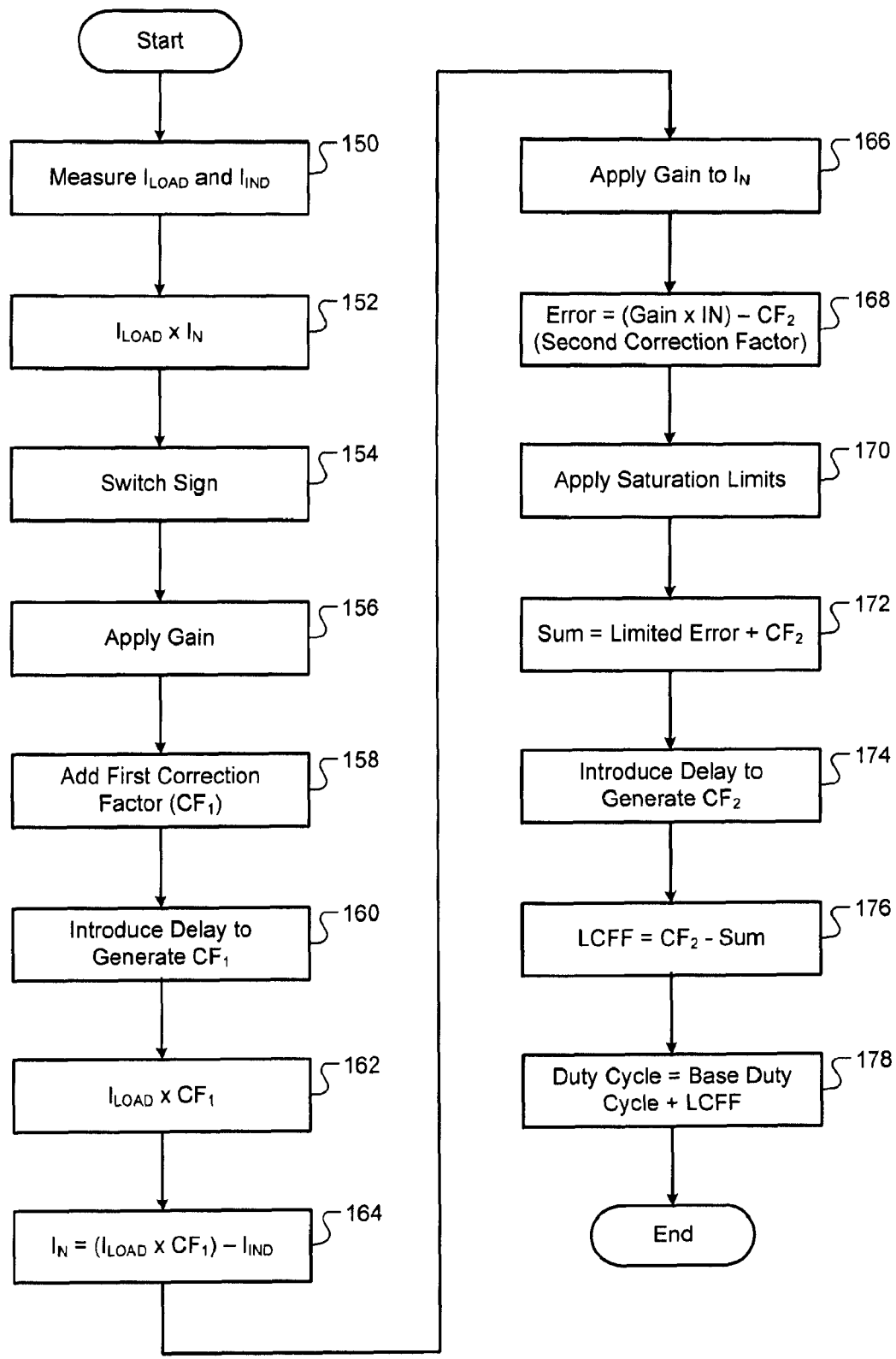
FIG. 3B is a flow diagram illustrating steps of a first method for feed-forward control of load current in a DC to DC buck converter according to one implementation of the present disclosure.

Referring now to FIG. 3B, the first feed-forward method begins at 150. At 150, the control module 20 measures the load current $I_{LOAD}$ and the inductor current $I_{IND}$. At 152, the control module 20 calculates a product of the load current $I_{LOAD}$ and the normalized current $I_N$. At 154, the control module 20 switches a sign of the product. At 156, the control module 20 applies a gain to the signed product. At 158, the control module 20 calculates a sum of the modified product and a first correction factor ($CF_1$). At 160, the control module 20 introduces a one sample Ts delay to the sum to generate the first correction factor $CF_1$. At 162, the control module 20 calculates a product of the load current $I_{LOAD}$ and the first correction factor $CF_1$. At 164, the control module 20 generates the normalized current based on a difference between the product and the inductor current $I_{IND}$. Control may then proceed to 166. While one cycle is shown, in some implementations control may return to 152 and repeat until the gain of the load current $I_{LOAD}$ is matched to the gain of the inductor current $I_{IND}$.

At 166, the control module 20 applies a gain to the normalized current $I_N$. At 168, the control module 20 calculates an error between the modified current and a second correction factor ($CF_2$). At 170, the control module 20 limits the error to a predetermined range (i.e., saturation limits). At 172, the control module 20 calculates a sum of the limited error and the second correction factor $CF_2$. At 174, the control module 20 introduces a one period Ts delay to the sum to generate the second correction factor $CF_2$. At 176, the control module 20 generates the LCFF signal based on a difference between the second correction factor $CF_2$ and the sum. At 178, the control module 20 generates the duty cycle for the switching module 12 based on a sum of a base duty cycle (based on the voltage command $V_{CMD}$) and the LCFF signal. Control may then end.

Figure 4A:
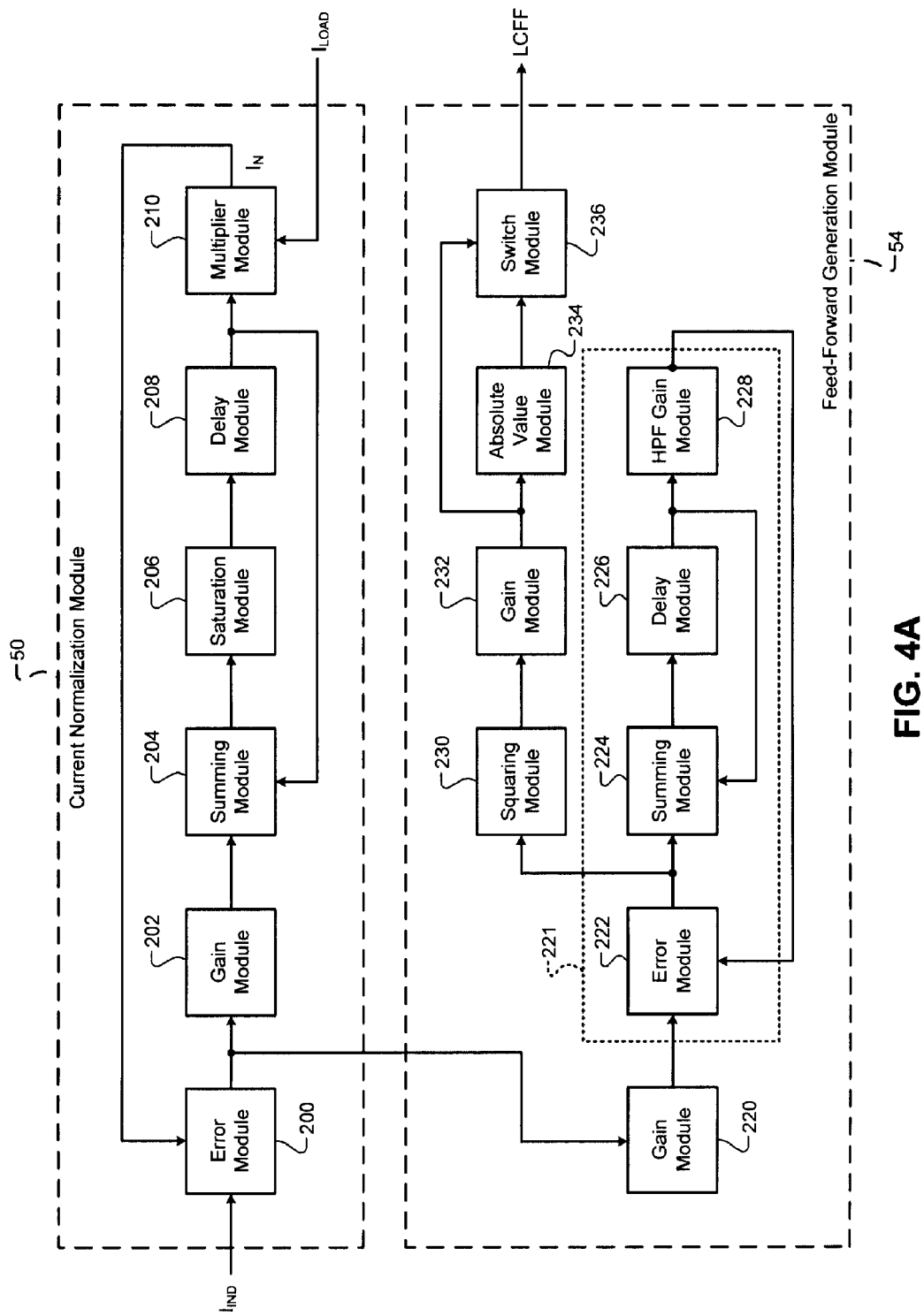
FIG. 4A is a functional block diagram of the current normalization module and the feed-forward generation module according to another implementation of the present disclosure.

Referring now to FIG. 4A, an example of the current normalization module 50 and the feed-forward generation module 54 according to the second feed-forward method is shown. The current normalization module 50 includes an error module 200, a gain module 202, a summing module 204, a saturation module 206, a delay module 208, and a multiplier module 210.

The error module 200 calculates a first error between the inductor current $I_{LOAD}$ and the normalized load current $I_N$ (received as feedback). The gain module 202 applies a gain to the first error. The summing module 204 calculates a sum of the output of the gain module 202 and a first correction factor. The saturation module 206 limits the sum to a predetermined range. The delay module 208 introduces a one period Ts delay to the limited sum to generate the first correction factor. The multiplier module 210 generates the normalized load current $I_N$ based on a product of the first correction factor and the load current $I_{LOAD}$.

The feed-forward generation module 54 includes a gain module 220, an HPF module 221, a squaring module 230, a gain module 232, an absolute value module 234, and a switch module 236. The gain module 220 applies a gain to the first error calculated by error module 200.

The HPF module 221 includes an error module 222, a summing module 224, a delay module 226, an HPF gain module 228. The HPF module 221 sets a corner frequency for high-pass filtering to remove DC error/offset. Specifically, the error module 222 calculates a second error between the output of the gain module 220 and an output of the HPF gain module 228. The summing module 224 calculates a sum of the second error and a second correction factor. The delay module 226 introduces a one period Ts delay to the sum to generate the second correction factor. The HPF gain module 228 applies an HPF gain. As previously described, while the HPF module 221 is implemented in the feed-forward generation module 54 according to the second feed-forward method, the HPF module 221 (or a similar HPF) may also be implemented in the first and/or third feed-forward methods for removal of DC error/offset.

The squaring module 230 calculates a square of the second error. For example only, the squaring module 230 may calculate a product of the second error and an absolute value of the second error. The gain module 232 applies a gain to the output of the squaring module 230. The absolute value module 234 calculates an absolute value of the output of the gain module 232. The switch module 236 generates the LCFF signal by selecting either the output of the gain module 232 or its absolute value output by the absolute value module 234. For example only, the switch module 236 may select the output of the gain module 232 if the output of the gain module 232 is greater than a predetermined value and otherwise may select the output of the absolute value module 234.

Figure 4B:
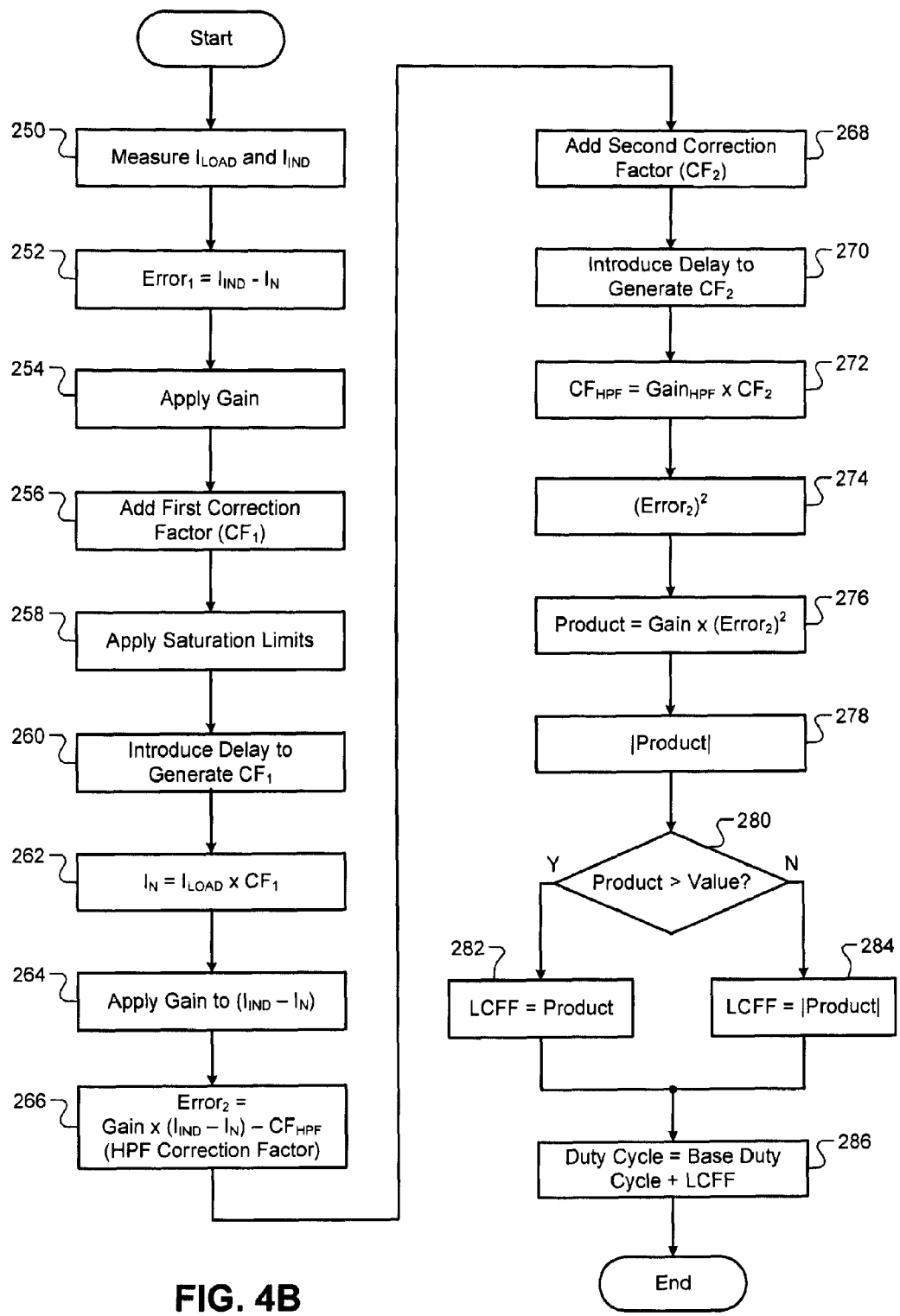
FIG. 4B is a flow diagram illustrating steps of a second method for feed-forward control of load current in a DC to DC buck converter according to one implementation of the present disclosure.

Referring now to FIG. 4B, the second feed-forward method begins at 250. At 250, the control module 20 measures the load current $I_{LOAD}$ and the inductor current $I_{IND}$. At 252, the control module 20 calculates a first error between the inductor current $I_{IND}$ and the normalized current $I_N$. At 254, the control module 20 applies a gain to the first error. At 256, the control module 20 calculates a sum of the first modified error and a first correction factor ($CF_1$). At 258, the control module 20 limits the sum to a predetermined range (i.e., saturation limits). At 260, the control module 20 introduces a one period Ts delay to the limited sum to generate the first correction factor $CF_1$. At 262, the control module 20 generates the normalized current $I_N$ based on a product of the first correction factor $CF_1$ and the load current $I_{LOAD}$. Control may then proceed to 264. While one cycle is shown, however, control may return to 252 and repeat until the gain of the load current $I_{LOAD}$ is matched to the gain of the inductor current $I_{IND}$.

At 264, the control module 20 applies a gain to the first error between the inductor current $I_{IND}$ and the normalized current $I_N$ (see 252). At 266, the control module 20 calculates a second error between the second modified error and an HPF correction factor ($CF_{HPF}$). At 268, the control module 20 calculates a sum of the second error and a second correction factor ($CF_2$). At 270, the control module 20 introduces a one period Ts delay to the sum to generate the second correction factor $CF_2$. At 272, the control module 20 generates the HPF correction factor $CF_{HPF}$ by applying an HPF gain to the second correction factor $CF_2$.

At 274, the control module 20 squares the second error. At 276, the control module 20 applies a gain to the squared error. At 278, the control module 20 calculates an absolute value of the product of the gain and the squared error. At 280, the control module 20 determines whether the product is greater than a predetermined value. If true, control may proceed to 282. If false, control may proceed to 284. At 282, the control module 20 may generate the LCFF signal based on the product and control may proceed to 286. At 284, the control module 20 may generate the LCFF signal based on the absolute value of the product and control may proceed to 286. At 286, the control module 20 may generate the duty cycle for the switching module 12 based on a sum of a base duty cycle (based on the voltage command $V_{CMD}$) and the LCFF signal. Control may then end.

Figure 4C:
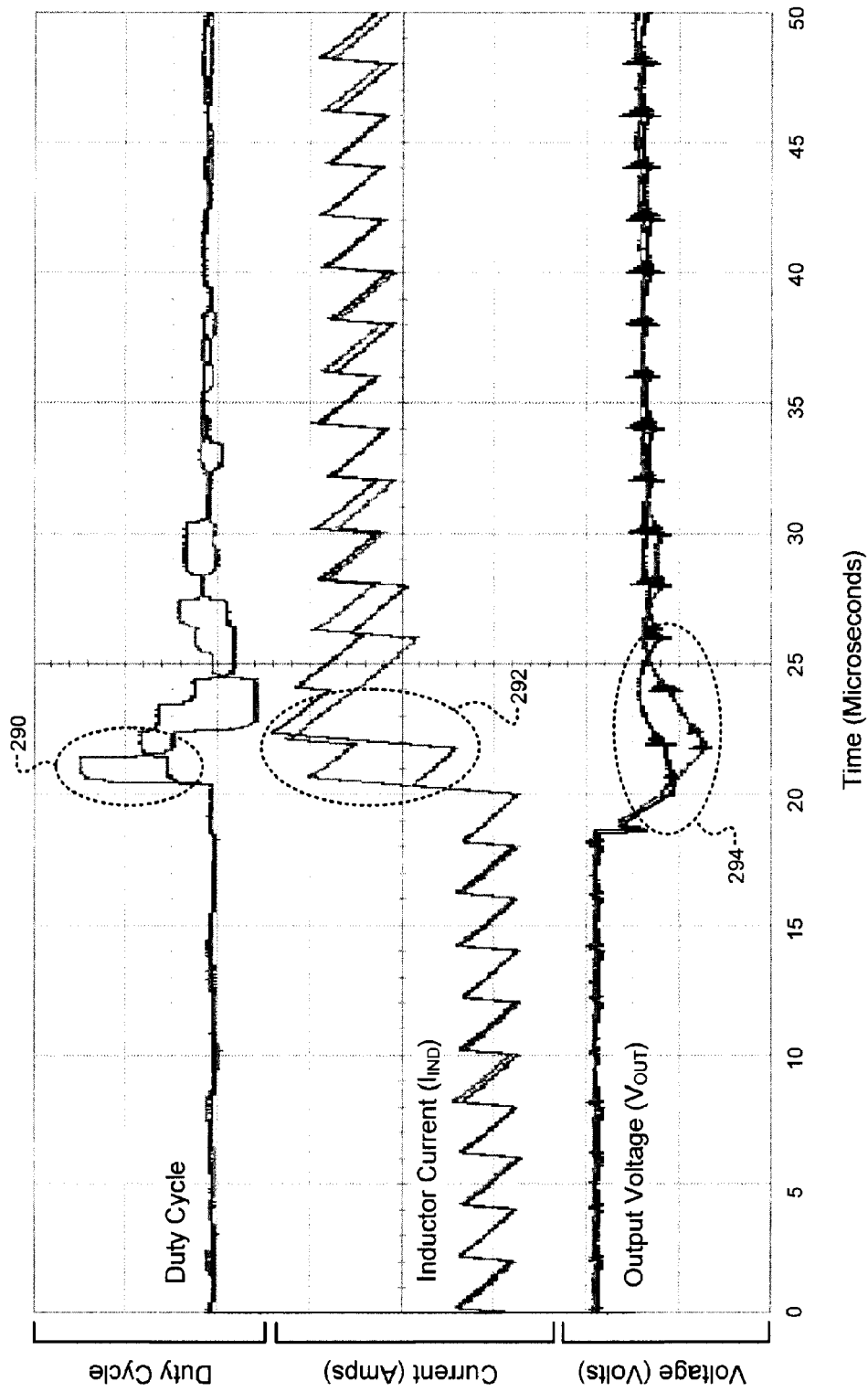
FIG. 4C is a graph illustrating simulated results of the second method for feed-forward control of load current in a DC to DC buck converter.

Referring now to FIG. 4C, a graph illustrating simulated results of the second feed-forward method compared to conventional duty cycle control is shown. As shown, feed-forward control of the load current $I_{LOAD}$ improved response and decreased a droop in output voltage $V_{OUT}$. Region 290 identifies the feed-forward control. Specifically, the LCFF signal is added to the base duty cycle causing an increase in the duty cycle compared to the conventional duty cycle control. Region 292 identifies the improved step response of the inductor current $I_{IND}$. Specifically, the inductor current $I_{IND}$ increases one PWM cycle earlier than the conventional duty cycle control. Lastly, region 294 identifies the decreased drop in output voltage $V_{OUT}$. Specifically, the drop in output voltage $V_{OUT}$ is decreased by approximately 1.0-1.5%.

Figure 5A:
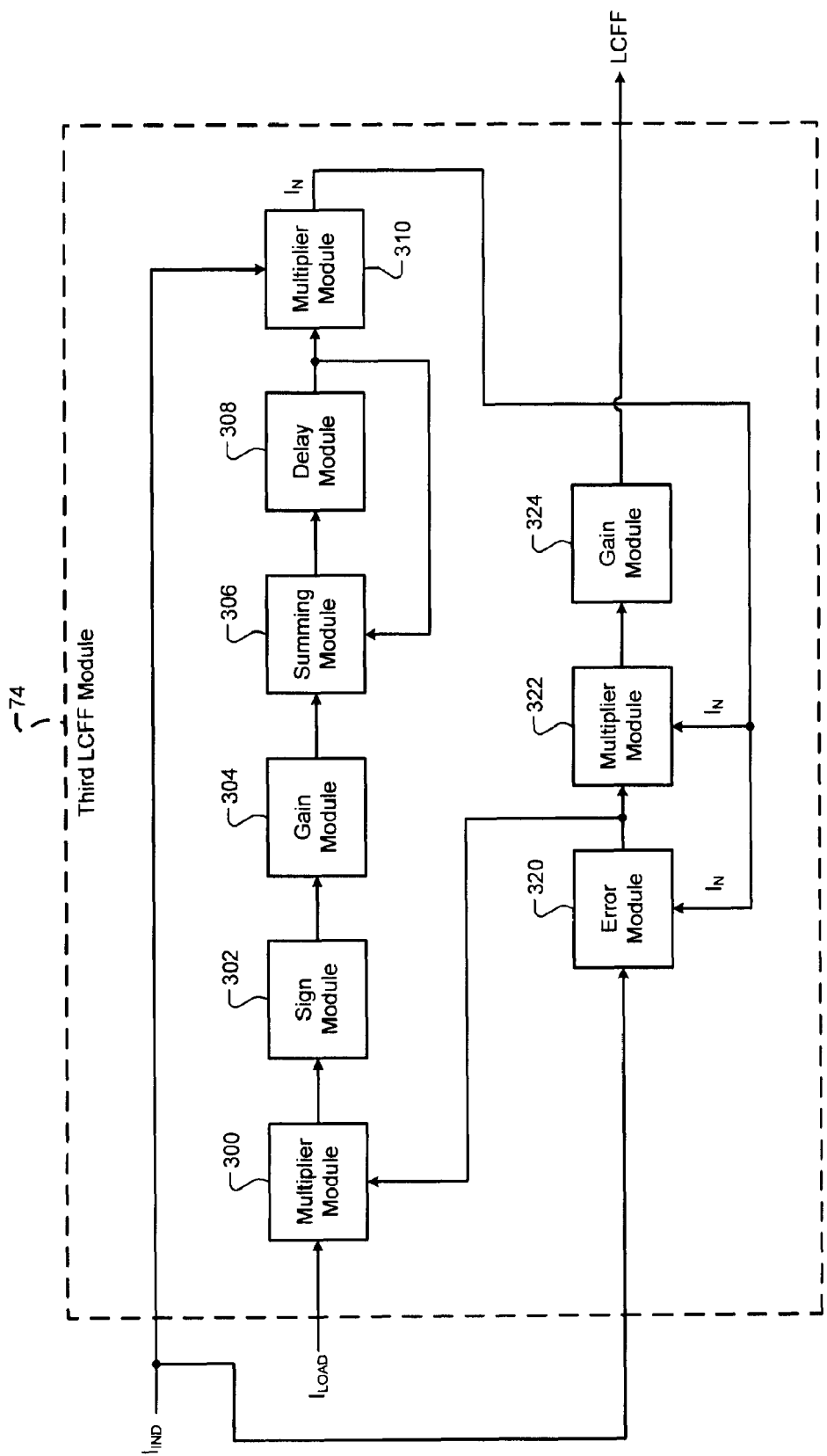
FIG. 5A is a functional block diagram of a module for generating a load current feed-forward (LCFF) signal based on a product of a normalized load current and a difference between inductor current and the normalized load current, according to another implementation of the present disclosure.

Referring now to FIG. 5A, an example of a third LCFF module 74 according to the third feed-forward method is shown. The third LCFF module 74 may generate the LCFF signal based on a product of inductor current $I_{IND}$ and a difference between the load current $I_{LOAD}$ and the inductor current $I_{IND}$ (i.e., $I_{IND} \times [I_{LOAD} - I_{IND}]$). The third LCFF module 74 may also perform current normalization according to the present disclosure. Specifically, the third LCFF module 74 may include a multiplier module 300, a sign module 302, a gain module 304, a summing module 306, a delay module 308, a multiplier module 310, an error module 320, a multiplier module 322, and a gain module 324.

The multiplier module 300 calculates a product of the load current $I_{LOAD}$ and an error between the inductor current $I_{IND}$ and the normalized current $I_N$ (received as feedback from the third LCFF module 74). The sign module 302 switches a sign of the product. The gain module 304 applies a gain to the signed product. The summing module 306 calculates a sum of the output of the gain module 304 and a correction factor. The delay module 308 introduces a one sample Ts delay to the sum to generate the correction factor. The multiplier module 310 generates the normalized current $I_N$ based on a product of the inductor current $I_{IND}$ and the correction factor. The error module 320 calculates the error between the inductor current $I_{IND}$ and the normalized current $I_N$. The multiplier module 322 calculates a product of the error and the normalized current $I_N$. The gain module 324 generates the LCFF signal by applying a gain to the product.

Figure 5B:
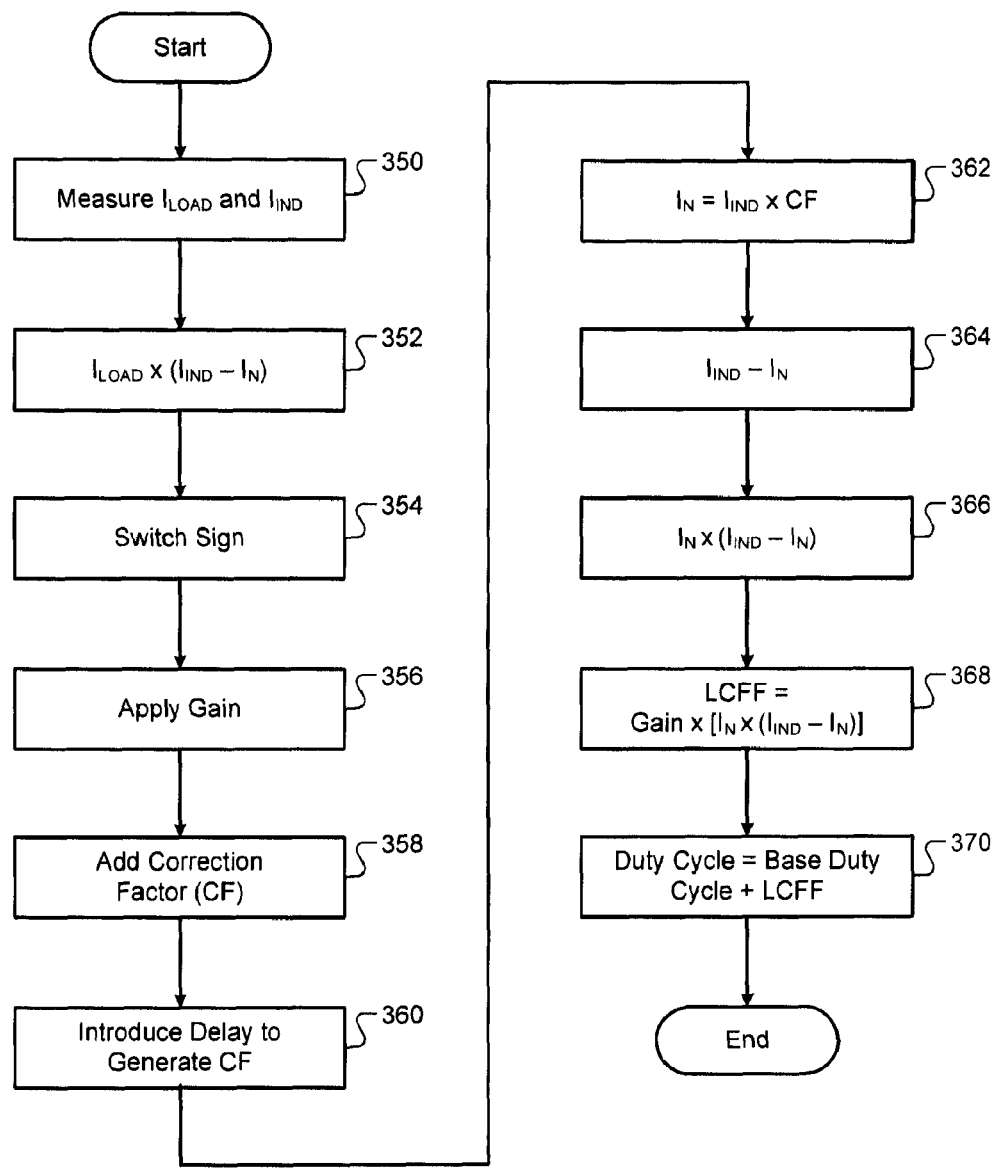
FIG. 5B is a flow diagram illustrating steps of a third method for feed-forward control of load current in a DC to DC buck converter according to one implementation of the present disclosure.

Referring now to FIG. 5B, the third feed-forward method begins at 350. At 350, the control module 20 measures the load current $I_{LOAD}$ and the inductor current $I_{IND}$. At 352, the control module 20 calculates a product of the load current $I_{LOAD}$ and an error between the inductor current $I_{IND}$ and the normalized current $I_N$. At 354, the control module 20 switches a sign of the product. At 356, the control module 20 applies a gain to the signed product. At 358, the control module 20 calculates a sum of the modified product and a correction factor (CF). At 360, the control module 20 introduces a one period Ts delay to the sum to generate the correction factor CF. At 362, the control module 20 calculates a product of the inductor current $I_{IND}$ and the correction factor CF. Control may then proceed to 364. While one cycle is shown, however, control may return to 352 and repeat until the gain of the load current $I_{LOAD}$ is matched to the gain of the inductor current $I_{IND}$.

At 364, the control module 20 calculates the error between the inductor current $I_{IND}$ and the normalized current $I_N$ (see 352). At 366, the control module 20 calculates a product of the error and the normalized current $I_N$. At 368, the control module 20 generates the LCFF signal by applying a gain to the product. At 370, the control module 20 generates the duty cycle for the switching module 12 based on a sum of a base duty cycle (based on the voltage command $V_{CMD}$) and the LCFF signal. Control may then end.

Figure 6:
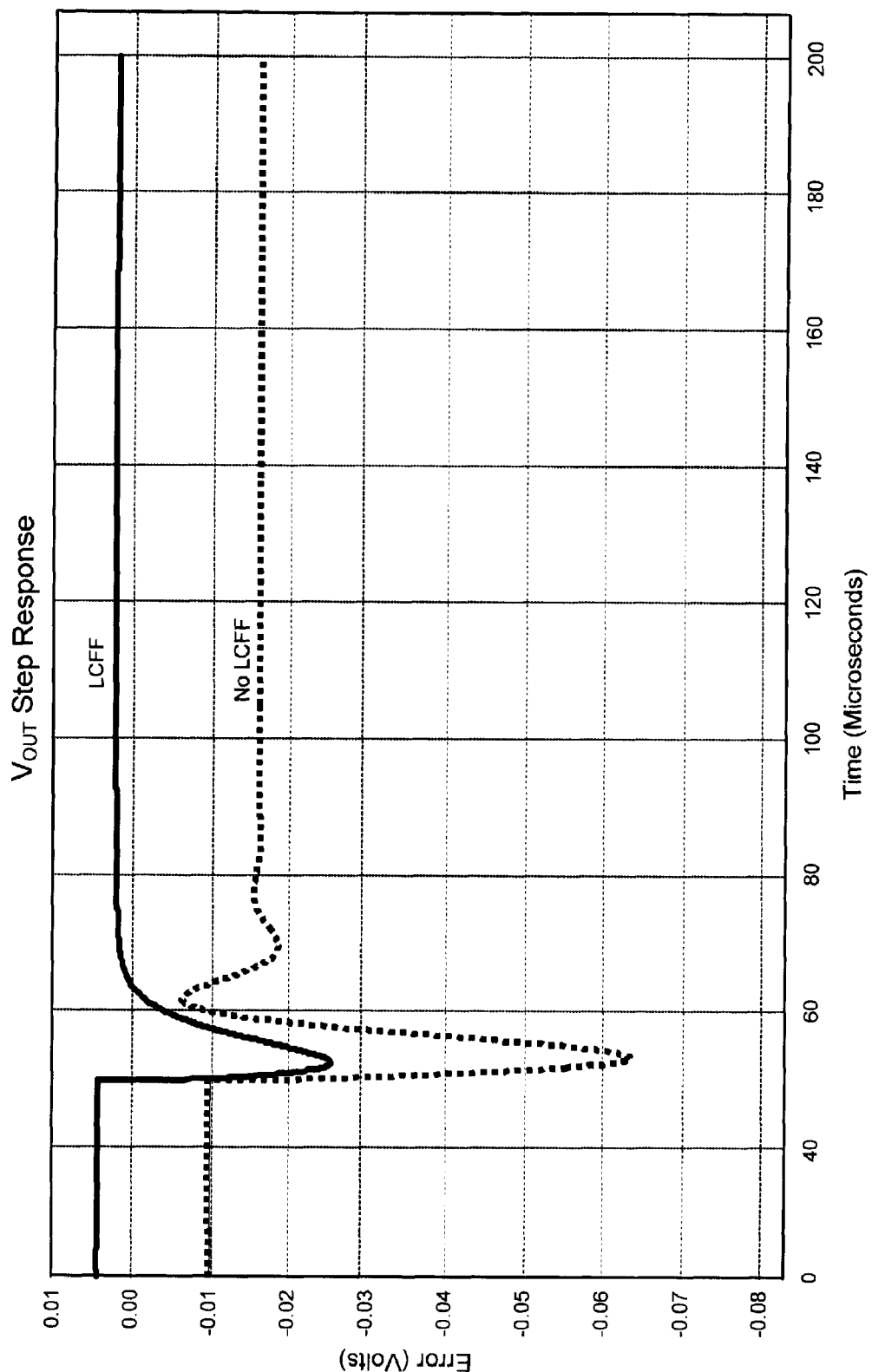
FIG. 6 is a graph illustrating simulated results of implementing feed-forward-control of load current in a DC to DC buck converter according to one implementation of the present disclosure while also decreasing feedback gains.

Referring now to FIG. 6, a graph illustrating simulated results of implementing feed-forward control of load current in a DC to DC buck converter while also decreasing feedback gains is shown. Specifically, the graph illustrates load current control with and without LCFF according to the present disclosure while decreasing feedback gains approximately 70%. As shown, the feed-forward control of load current according to the present disclosure increases the robustness of the control system. In other words, the curve identified as having implemented LCFF control has less output voltage error and an overall smoother response. This graph, however, may be used merely for illustration of the robustness of the systems and methods of the present disclosure.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for controlling load current in a voltage converter, the system comprising:
a current normalization module that receives a first measurement corresponding to the load current, receives a second measurement corresponding to an inductor current, and matches a first gain of the first measurement corresponding to the load current to a second gain of the second measurement corresponding to the inductor current to generate a normalized load current;
a feed-forward generation module that receives the normalized load current from the current normalization module and generates a load current feed-forward (LCFF) signal based on the normalized load current; and a duty cycle generation module that generates a duty cycle used to control the voltage converter based on a commanded output voltage of the voltage converter and the LCFF signal.

2. The system of claim 1, wherein the current normalization module receives the first measurement via a printed circuit board trace.

3. The system of claim 1, wherein the second measurement corresponds to a direct-current resistance measurement of the inductor current.

4. The system of claim 1, wherein the LCFF signal corresponds to one of an inductor volt-second demanded by the load current, an approximate duty cycle demanded by the load current, and an ideal duty cycle.

5. The system of claim 1, wherein, to generate the normalized load current, the current normalization module determines an error between (i) the second measurement corresponding to the inductor current and (ii) a corrected load current.

6. The system of claim 1, wherein, to generate the normalized load current, the current normalization module determines a product of (i) the first measurement corresponding to the load current and (ii) a correction factor associated with the second measurement corresponding to the inductor current.

7. The system of claim 1, wherein, to generate the normalized load current, the current normalization module determines a product of (i) the second measurement corresponding to the inductor current and (ii) a correction factor associated with the first measurement corresponding to the load current.

8. The system of claim 1, wherein the feed-forward generation module generates the LCFF signal based on an error between the normalized load current and the second measurement corresponding to the inductor current.

9. The system of claim 1, wherein the feed-forward generation module generates the LCFF signal based on a product of
the second measurement corresponding to the inductor current, and
a difference between the normalized load current and the second measurement corresponding to the inductor current.

10. A method for controlling load current in a voltage converter, the method comprising:
receiving a first measurement corresponding to the load current;
receiving a second measurement corresponding to an inductor current;
matching a first gain of the first measurement corresponding to the load current to a second gain of the second measurement corresponding to the inductor current to generate a normalized load current;
generating a load current feed-forward (LCFF) signal based on the normalized load current; and
generating a duty cycle used to control the voltage converter based on a commanded output voltage of the voltage converter and the LCFF signal.

11. The method of claim 10, wherein receiving the first measurement includes receiving the first measurement via a printed circuit board trace.

12. The method of claim 10, wherein the second measurement corresponds to a direct-current resistance measurement of the inductor current.

13. The method of claim 10, wherein the LCFF signal corresponds to one of an inductor volt-second demanded by the load current, an approximate duty cycle demanded by the load current, and an ideal duty cycle.

14. The method of claim 10, wherein generating the normalized load current includes determining an error between (i) the second measurement corresponding to the inductor current and (ii) a corrected load current.

15. The method of claim 10, wherein generating the normalized load current includes determining a product of (i) the first measurement corresponding to the load current and (ii) a correction factor associated with the second measurement corresponding to the inductor current.

16. The method of claim 10, wherein generating the normalized load current includes determining a product of (i) the second measurement corresponding to the inductor current and (ii) a correction factor associated with the first measurement corresponding to the load current.

17. The method of claim 10, wherein generating the LCFF signal includes generating the LCFF signal based on an error between the normalized load current and the second measurement corresponding to the inductor current.

18. The method of claim 10, wherein generating the LCFF signal includes generating the LCFF signal based on a product of
    the second measurement corresponding to the inductor current, and
    a difference between the normalized load current and the second measurement corresponding to the inductor current.

\* \* \* \* \*

UNITED STATES PATENT AND TRADEMARK OFFICE
CERTIFICATE OF CORRECTION

PATENT NO.        : 9,438,110 B2                                    Page 1 of 1
APPLICATION NO.   : 14/274904
DATED             : September 6, 2016
INVENTOR(S)       : Mansur Kiadeh et al.

It is certified that error appears in the above-identified patent and that said Letters Patent is hereby corrected as shown below:

In the Specification:

Column 6, Line 24      Delete "Is" and insert --Ts--

Signed and Sealed this
Fifteenth Day of November, 2016

Michelle K. Lee
*Director of the United States Patent and Trademark Office*